(12) United States Patent
Ochiai

(10) Patent No.: US 9,925,923 B2
(45) Date of Patent: Mar. 27, 2018

(54) VEHICULAR DOOR MIRROR

(71) Applicant: ICHIKOH INDUSTRIES, LTD., Isehara-shi, Kanagawa-ken (JP)

(72) Inventor: Yasuo Ochiai, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 0 days.

(21) Appl. No.: 15/309,581

(22) PCT Filed: May 9, 2014

(86) PCT No.: PCT/JP2014/062484
§ 371 (c)(1),
(2) Date: Nov. 8, 2016

(87) PCT Pub. No.: WO2015/170404
PCT Pub. Date: Nov. 12, 2015

(65) Prior Publication Data
US 2017/0151911 A1    Jun. 1, 2017

(51) Int. Cl.
*G02B 7/18*    (2006.01)
*B60R 1/076*    (2006.01)

(52) U.S. Cl.
CPC .................................. *B60R 1/076* (2013.01)

(58) Field of Classification Search
CPC . G02B 1/02; G02B 1/06–1/078; Y10S 248/90
USPC ......................................................... 359/841
See application file for complete search history.

(56) References Cited

U.S. PATENT DOCUMENTS

2008/0149803 A1\* 6/2008 Yoshida .................. B60R 1/074
248/479

FOREIGN PATENT DOCUMENTS

JP           2011-121560 A     6/2011

\* cited by examiner

*Primary Examiner* — Euncha Cherry
(74) *Attorney, Agent, or Firm* — Foley & Lardner LLP

(57) ABSTRACT

Provided is a vehicular door mirror capable of configuring an engagement structure for holding a folded storage position of a door mirror unit without design problems. When a door mirror unit is rotated from a deployed use position to a folded storage position, a protrusion portion disposed on a groove upper surface of a rotation regulating groove of a bearing portion on the door mirror unit side slidably contacts and rides over, during the rotating process, a protrusion portion disposed on the upper edge of a rotation regulating piece of a shaft until the protrusion portions fall into a mutual engagement, whereby the folded storage position of the door mirror unit is held.

4 Claims, 7 Drawing Sheets

(A)

(B)

(C)

(COURSE OF ROTATION)
(DEPLOYED USE POSITION P2)          (FOLDED STORAGE POSITION P1)

FIG. 3
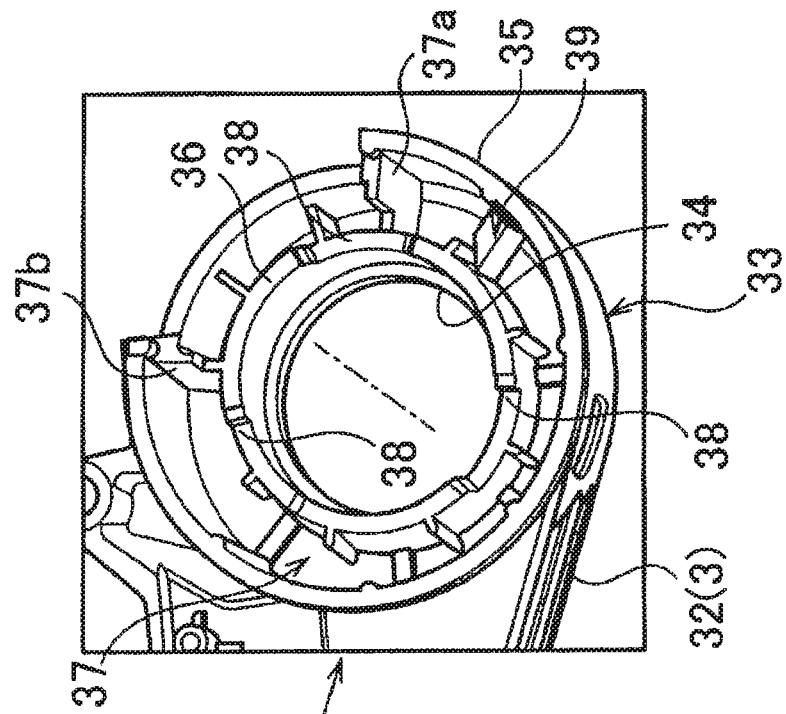
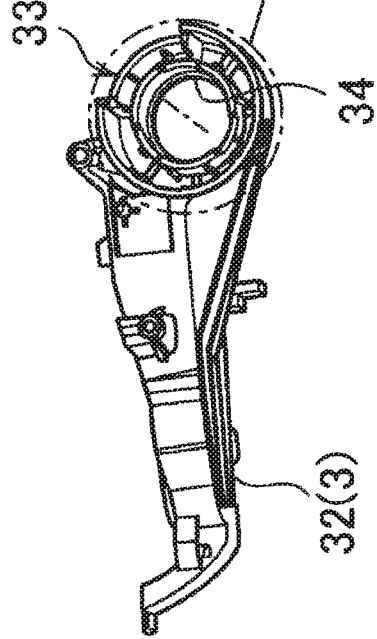

VEHICULAR DOOR MIRROR

TECHNICAL FIELD

The present invention relates to a vehicular door mirror.

BACKGROUND ART

In so far as a vehicular door mirror is concerned, a door mirror unit is assembled via a shaft to a door mirror base which is fixed to a vehicular side part (a door side).

The door mirror unit is made turnable at a folded storage position at which a mirror surface faces the door side about the shaft and a deployed use position at which the mirror surface faces a vehicular rear side while a phase is varied at a required angle from the folded storage position.

Thus, for example, as shown in Patent Literature 1, a rotation moderation mechanism is provided at a respective one of a shaft and a bearing portion of a door mirror unit so that the deployed use position of the door mirror unit can be appropriately retained.

In so far as the rotation moderation mechanism is concerned, a plurality of recessed and protrusion engagement portions to engage the shaft and the bearing portion from each other in a vertical direction are provided on a same planar circumference and to these recessed and protrusion engagement portions, a pressing force in the vertical direction is imparted by a spring so that the recessed and protrusion engagement portions engage with or disengage from each other in a rotation direction due to a rotation operation of the door mirror unit to thereby retain a required rotation position with a sense of moderation.

CITATION LIST

Patent Literature

Patent Literature 1: Japanese Unexamined Patent Application Publication No. 2011-121560

SUMMARY OF THE INVENTION

Problems to be Solved by the Invention

The recessed and protrusion engagement portions that are provided at the respective one of the shaft and bearing portion described above are respectively provided at a relative rotation position which corresponds to the deployed use position of the door mirror unit and at a relative rotation position which corresponds to the folded storage position thereof, and the deployed use position and the folded storage position, of the door mirror unit, can be thereby appropriately retained.

However, in a small sized door mirror unit, a shaft and its bearing portion are also downsized; and therefore, there may be a case in which it becomes difficult in terms of space requirements to set the recessed and protrusion engagement portion at the rotation position that corresponds to the folded storage position.

Thus, in particular, in a door mirror of a manual storage type, if an external force in the deployment direction by a car washing machine acts on the door mirror unit, for example, in a state in which the door mirror unit is rotated at the folded storage position, there is a possibility that the door mirror unit unfolds and rotates and then is damaged.

Therefore, the present invention provides a vehicular door mirror in which an engagement construction to retain a folded storage position can be set at a respective one of a shaft and a door mirror unit without being affected by setting of a rotation moderation mechanism which retains a deployed use position of the door mirror unit.

Means for Solving the Problems

A vehicular door mirror according to the present invention comprising: a door mirror base which is fixed to a vehicular side part; a shaft which is fixed to the door mirror base; and a door mirror unit which is rotatable about the shaft at a folded storage position and a deployed use position via a bearing portion.

The bearing portion is a structure which is equipped with a substantially annular rotation regulating groove at a lower face side thereof, and which, in the rotation regulating groove, engages and disposes a rotation regulating piece provided in the shaft and a rotation moderation mechanism is provided at a respective one of the shaft and the bearing portion to retains a deployed use position of the door mirror unit.

And a respective one of an upper edge of the rotation regulating piece and a groove top face of the rotation regulating groove opposing thereto are provided at a protrusion portions which ride over, drop, and engage in a course of rotation from the deployed use position to the folded storage position of the door mirror unit and then the retain the folded storage position.

Effect of the Invention

According to the present invention, if a door mirror unit is rotated from a deployed use position to a folded storage position, at the course of the rotation, a protrusion portion of a groove top face of a rotation regulating groove comes into sliding contact with and rides over a protrusion portion at an upper edge of a rotation regulating piece and then these protrusion portions drop and engage, and the folded storage position of the door mirror unit is retained.

As a result, for example, even if the external force in the deployment direction by the car washing machine acts on the door mirror unit, the detailed rotation is regulated, and it is possible to avoid damage to the door mirror unit.

In addition, in a case where the door mirror unit described above is manually stored, the respective protrusion portions ride over, drop, and engage, and a sense of click can be thereby felt; and accordingly, it is possible to recognize that a rotation leading up to the appropriate storage position has completed.

BRIEF DESCRIPTION OF THE DRAWINGS

FIG. 3 (A) and FIG. 3 (B) are bottom views respectively showing an overview in a case where the bracket shown in FIG. 2 is seen from a lower side and an enlarged view of essential parts thereof.

MODE FOR CARRYING OUT THE INVENTION

Figure 1:
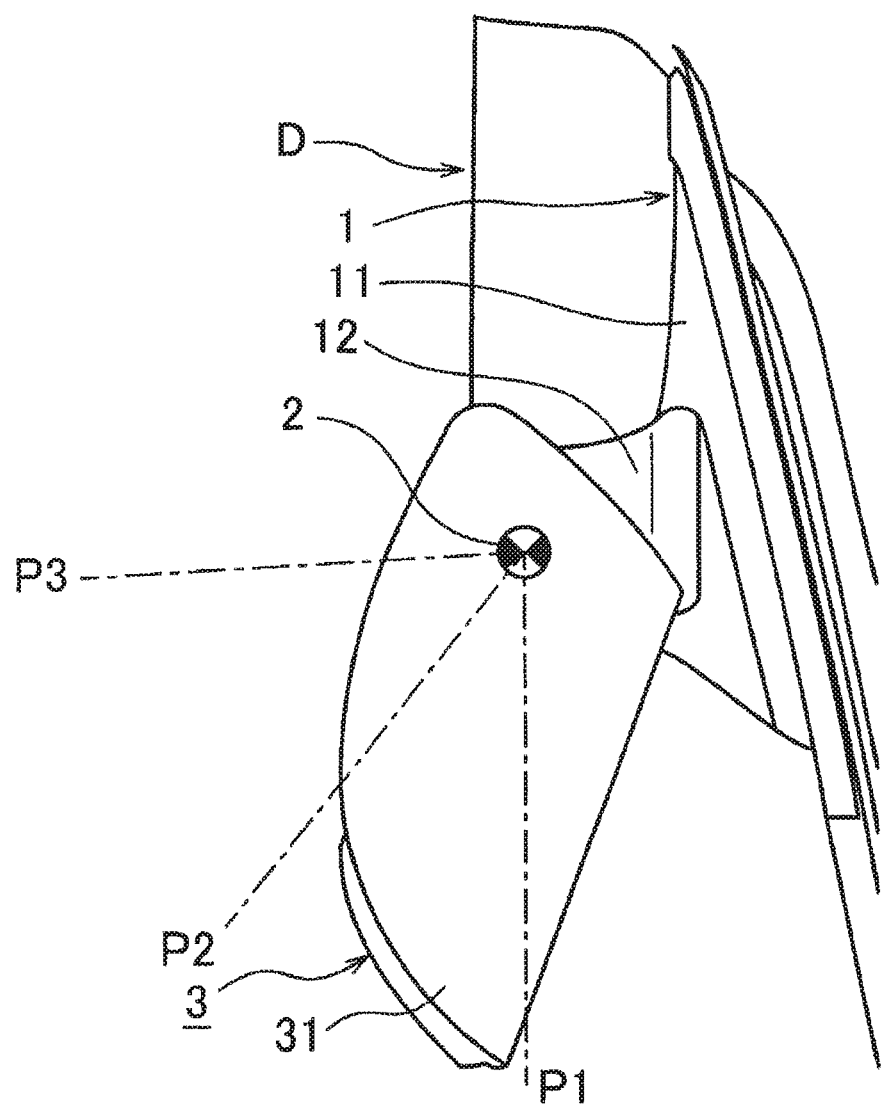
FIG. 1 is an explanatory plan view showing a state of arrangement of a vehicular door mirror of the present invention.

Hereinafter, embodiments of the present invention will be described in detail with reference to the drawing by way of example of a door mirror of a manual storage type.

FIG. 1 shows a state of arrangement of a door mirror at a left side of a vehicle. The door mirror of the embodiment shown in FIG. 1 is equipped with: a door mirror base 1 which is fixed to a vehicular side part, specifically a door side D of a front door; a shaft 2 which is fixed to the door mirror base 1; and a door mirror unit 3 which has been turnably supported on the door mirror base 1 by means of the shaft 2.

Figure 2:
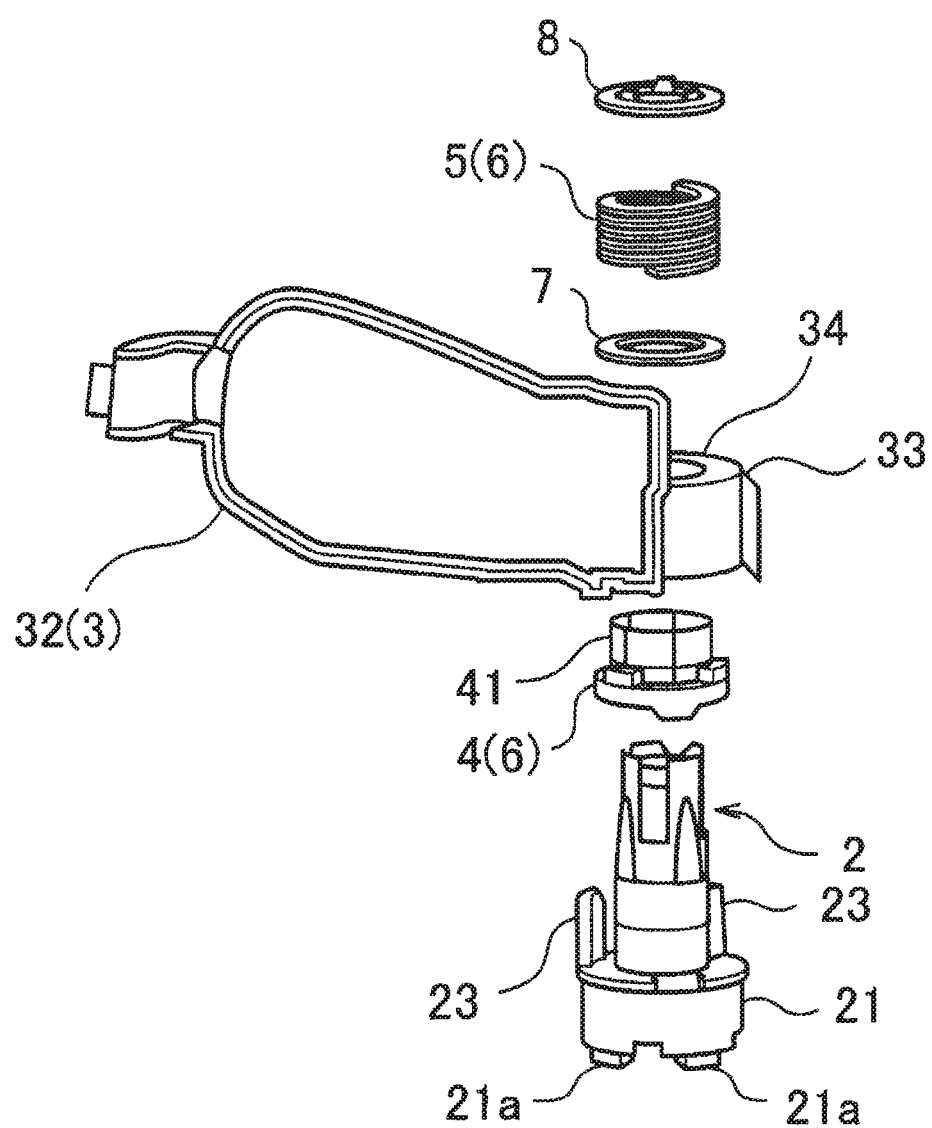
FIG. 2 is an exploded perspective view of a bracket and a shaft of a door mirror unit.

In each of examples shown in FIG. 2 and FIG. 3, there is shown only a bracket 32 in a state in which internal functional parts including a mirror main body and a housing 31 shown in FIG. 1 have been removed from the door mirror unit 3.

The door mirror base 1, the shaft 2, and the housing 31 and the bracket 32 of the door mirror unit 3 all are made of an appropriate synthetic resin.

The door mirror base 1 is equipped with an attachment portion 11 which is securely fixed to the door size D; and an arm portion 12 substantially horizontally overhanging laterally from the attachment portion 11 and supporting the door mirror unit 3 via the shaft 2.

The shaft 2 is assembled to the door mirror unit 3 in a subsidiary manner, and a lower end thereof is fixed to the arm portion 12 of the door mirror base 1.

Specifically, at one end of the bracket 32 of the door mirror unit 3, a bearing portion 33 forming a shaft insertion hole 34 is provided.

An outer circumference of the bearing portion 33 is formed in a substantially semicircular shape which is coaxial to the shaft insertion hole 34.

At a lower face side of the bearing portion 33, a substantially annular rotation regulating groove 37 which is set at a required groove width is formed of: an outer circumferential wall 35 which has been formed on an outer circumference of the substantially semicircular shape; and an inner circumferential wall 36 which has been formed on a hole edge of the shaft insertion hole 34.

The rotation regulating groove 37, as shown in FIG. 1, is partitioned in a shape of a fan by a groove stop end wall 37a to specify a folded storage position P1 of the door mirror unit 3 and a groove stop end wall 37 to specify a maximally unfolded position P3.

The shaft 2 is integrally erected on an erection base portion surface 22 forming a top face of a substantially cylindrical base portion 21 of which lower side has been opened, and is disposed to be inserted into the bearing hole 34 from a lower side of the bracket 32. Inside of the base portion 21, a plurality of boss portions 21a are protruded, and the boss portions 21a are securely fixed onto the arm portion 12 of the door mirror base 1.

Along a circumferential edge of the erection base portion surface 22 on a bottom surface of the shaft 2, a rotation regulating piece 23 which engages with the rotation regulating groove 37 on a bottom surface of the bearing portion 33 is integrally erected.

In this manner, one groove stop end wall 37a in the rotation regulating groove 37 of the bracket 22 described above is engagingly locked with one side edge of the rotation regulating piece 23, and the folded storage position P1 of the door mirror unit 3 is thereby specified; and the other groove stop end wall 37 is engagingly locked with the other side edge of the rotation regulating piece 23, and the maximally unfolded position P3 is thereby specified.

Figure 5:
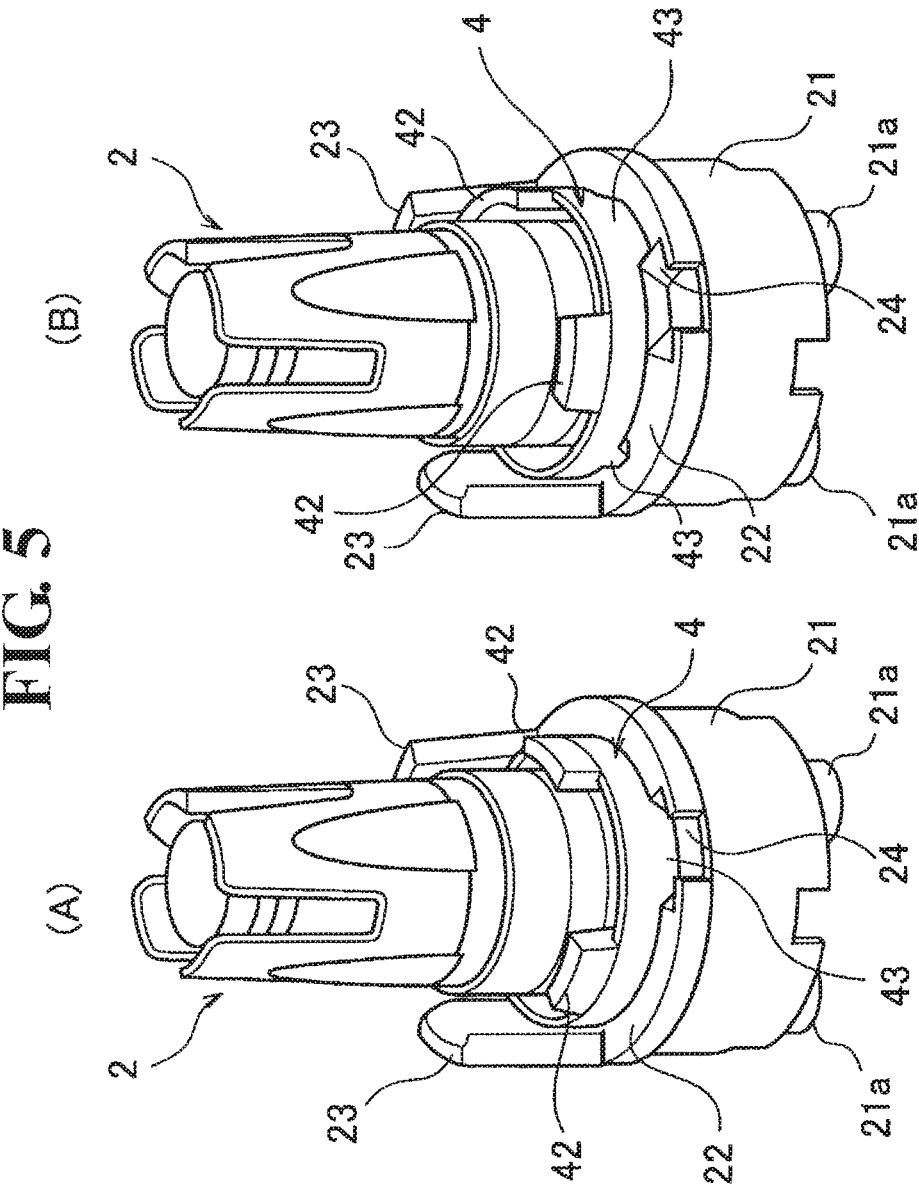
FIG. 5 (A) and FIG. 5 (B) are perspective views respectively showing positional relationships which correspond to a time of deployed use and a time of folded storage of a rotation top that has been engagingly inserted into the shaft.

At a base part of the shaft 2, as shown in FIG. 5, a rotation top 4 formed in a shape of a ring is movably disposed to be engagingly inserted in a circumferential direction and in an axial direction.

The rotation top 4 is made of an appropriate synthetic resin as in the shaft 2 and the bracket 32 or the like. Around an inner circumference of the ring, a collar 41 which comes into sliding contact with a lower edge of the shaft insertion hole 34 of the bearing portion 33 and an inner circumferential wall 36 that follows the lower edge are formed to be integral with each other.

On a top face of the ring of the rotation top 4, all over the proximal part of the collar 41, a plurality of engagingly locking protrusions 42 are intermittently provided to be integral with one another in a circumferential direction, whereas at an end edge of the inner circumferential wall 36, a plurality of cutout portions 38 with which the engagingly locking protrusions 42 respectively engage are intermittently formed in the circumferential direction.

In this manner, in a state in which the engagingly locking protrusions 42 and the cutout portions 38 engage with one another, the rotation top 4 is rotatable to be integral with the bracket 32 with respect to the shaft 2.

In addition, on a bottom face of the ring of the rotation top 4, a plurality of protrusion edge parts 43 are provided in the circumferential direction, whereas on the erection base portion surface 22 of the shaft 2, there is provided a recessed portion 24 for specifying the deployed use position P2 at which the protrusion edge part 43 drops and engages with the erection base portion surface 22 when the door mirror unit 3 has been rotated from the folded storage position P1 to the deployment direction.

These protrusion edge part 43 and recessed portion 24 each form a circumferential end edge in a diagonal manner, so that both of them easily engage with or disengage from each other.

At an upper end part which protrudes from the bearing portion 33 of the shaft 2, a coil spring 5 is elastically equipped in a compressed state.

The coil spring 5 constitutes a rotation moderation mechanism 6 of the door mirror unit 3 together with the rotation top 4 described above; functions as retention of a pressing force of the bearing portion 33 and the rotation top 4 with respect to the erection base portion surface 22 of the shaft 2 and as prevention of a backlash of the door mirror unit 3; and is elastically equipped in a compressed state between a washer 7 which has been disposed on a top face of the bearing portion 33 and a push nut 8 which has been engagingly inserted into and then engagingly fitted to an upper end part of the shaft 2.

In this manner, the door mirror unit 3 is manually rotatable with respect to the door mirror base 1, at the folded storage position P1 at which the mirror surface faces the door side about the shaft 2 and at the deployed use position P2 at which the mirror surface faces the vehicular rear side while a phase is varied at a required angle from the folded storage position P1.

In addition, at the deployed use position P2, in a case where an excessive external force has acted on the door mirror unit 3 in the deployment direction, the door mirror unit 3 rotates up to the maximally unfolded position P3 and then a load on the door mirror unit 3 is reduced to avoid damage thereto.

At this time, a static posture of the door mirror unit 3 is retained by means of a compression resisting force of the coil spring 5 of the rotation moderation mechanism 6 and a sense of click can be felt during a rotation operation due to engagement or disengagement between the recessed portion 24 and the protrusion edge part 43 at the deployed use position P2.

Figure 4:
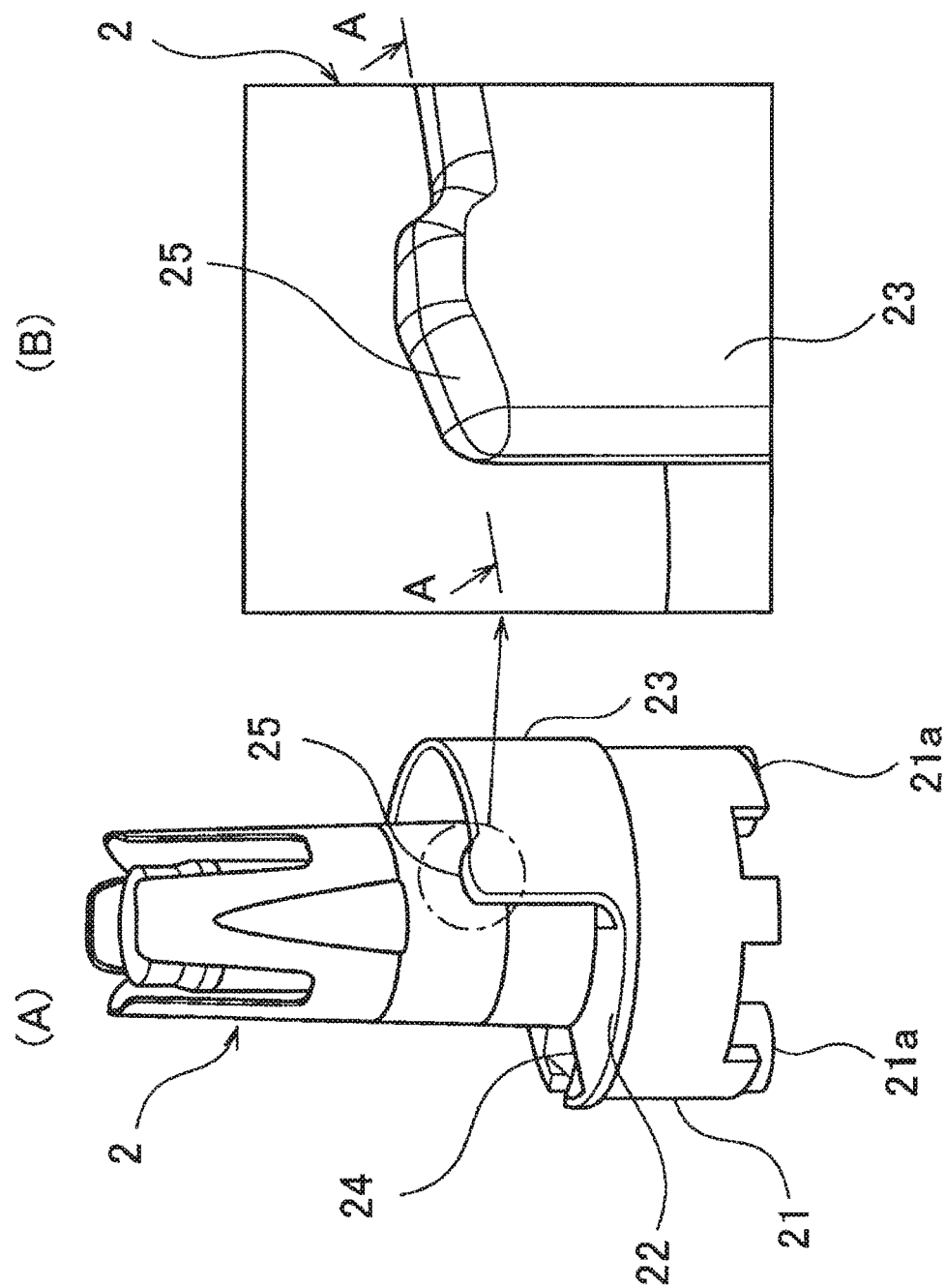
FIG. 4 (A) and FIG. 4 (B) are perspective views respectively showing an overview of the shaft shown in FIG. 2 and an enlarged view of essential parts thereof.

Here, at a respective one of the upper edge of the rotation regulating piece 23 and a groove top face of the rotation regulating groove 37 that opposes thereto, as shown in FIG. 3 and FIG. 4, there are provided protrusion portions 25, 39 which respectively ride over, drop, and engage in the course of rotation from the deployed use position P2 to the folded storage position P1 of the door mirror unit 3 and then retain the folded storage position P1.

In the embodiment, the protrusion portion 25 of the rotation regulating piece 23 is formed at an upper edge of an end edge side at which the rotation regulating piece 23 engagingly locks with the groove stop end wall 37a that specifies the folded storage position P1 in the rotation regulating groove 37.

On the other hand, the protrusion portion 39 at the rotation regulating groove 37 side is formed on a groove top face at a position at intervals which are equivalent to a length of the protrusion portion 25 from the groove stop end wall 37a.

In this manner, according to the structure of the embodiment, if the door mirror unit 3 is rotated by means of manual operation from the deployed use position P2 to the folded storage position P1, if the rotation regulating piece 37 reaches the vicinity of one groove stop end wall 37a at the course of the rotation, the protrusion portion 39 on the groove top face rides over the protrusion portion 25 at an upper edge of the rotation regulating piece 23.

At this time, the door mirror unit 3 is slightly lifted up and moved on an axial line of the shaft 2 together with the rotation top 4 against the spring force of the coil spring 5 of the rotation moderation mechanism 6 to thereby permit riding of the respective one of the protrusion portions 25, 39 described above.

Figure 6:
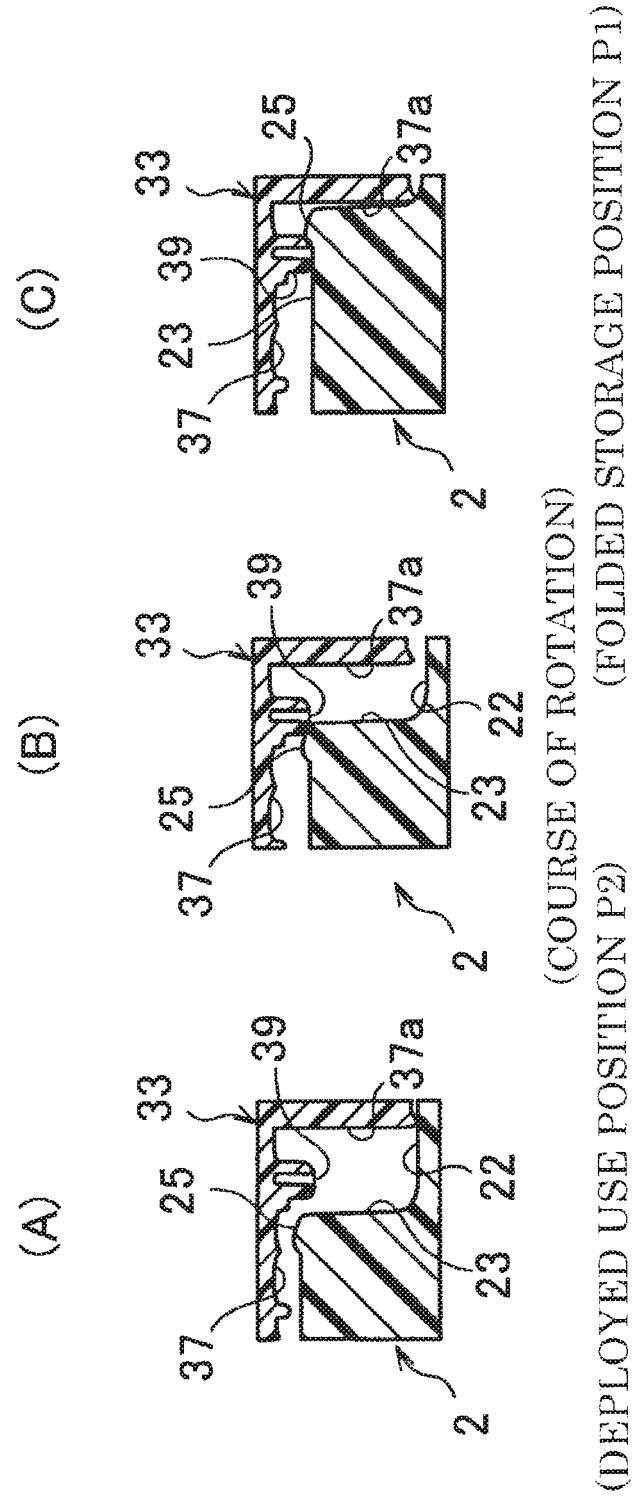
FIG. 6 (A), FIG. 6 (B), and FIG. 6 (C) are explanatory sectional views, each of which is equivalent to the line A-A of FIG. 4 (B) and shows the source of drop engagement of the respective protrusion portions of a rotation regulating piece and a rotation regulating groove.

In addition, when the protrusion portion 39 rides over the protrusion portion 25, the protrusion portion 39 drops and engages in a gap between the protrusion portion 25 and the groove stop end wall 37a due to the spring force of the coil spring 5 (refer to FIG. 6 (A) to FIG. 6 (C)).

In this manner, the folded storage position P1 of the door mirror unit 3 is securely retained due to engagement of the respective one of these protrusion portions 25, 39 and the spring force of the coil spring 5.

As a result, for example, even if an external force in the deployment direction by the car washing machine acts on the door mirror unit 3 that is kept in the folded storage state, the rotation of the door mirror unit 3 in the deployment direction is regulated, and it is possible to avoid damage to the door mirror unit 3 after forcibly rotated in excess of the maximally rotation position P3.

In addition, in a case where the door mirror unit 3 described above is manually stored, the respective protrusion portions 25, 39 ride over, drop, and engage, and a sense of click can be thereby felt; and accordingly, it is possible to recognize that a rotation operation leading up to the appropriate folded storage position P1 has completed, and it is also possible to avoid an occurrence of a storage operation failure.

Here, at the folded storage position P1 of the door mirror unit 3 as well, essentially, it is preferable that there be employed a structure of engagement between the protrusion edge part 43 of the rotation top 4 and the recessed portion 24 of the erection base portion surface 22 of the shaft 2 as in retention of a posture at the deployed use position P2; and however, in order to ensure an appropriate engagement force, there is a need to set these protrusion edge part 43 and recessed portion 24 so as to be large to a certain extent in dimensions to be formed.

On the other hand, an angle of rotation between the folded storage position P1 and the deployed use position P2 of the door mirror unit 3 does not need to be set to be so large, and at the periphery of the shaft 2 that is a center of rotation, the A-B strokes of rotation of the rotation top 4 are extremely small.

Thus, at the folded storage position P1 as well, even if an attempt is made to constitute a structure of engagement between the protrusion edge part 43 and the recessed portion 24 at the deployed use position P2 of the rotation moderation mechanism 6, it is difficult to ensure an installation space therefor, and as long as the door mirror unit 3 is small in size, the shaft 2 is also inevitably small in size; and therefore, it is impossible to employ the structure of engagement.

On the other hand, in the embodiment, as described previously, there are provided the protrusion portions 25, 39 which respectively drop and engage with the respective one of the upper edge of the rotation regulating piece 23 of the shaft 2 and the groove top face of the rotation regulating groove 37 of the bearing portion 33 at the course of rotation from the deployed use position P2 to the folded storage position P1.

In this manner, the structure of engagement for retaining the folded storage position P1 can be employed in a reasonable manner in terms of design requirements without being affected by setting of the structure of engagement that is made of the recessed portion 24 and the protrusion edge part 43 for retaining the deployed use position P2 by means of the rotation moderation mechanism 6, and it is possible to provide a vehicular door mirror of which quality is high.

Figure 7:
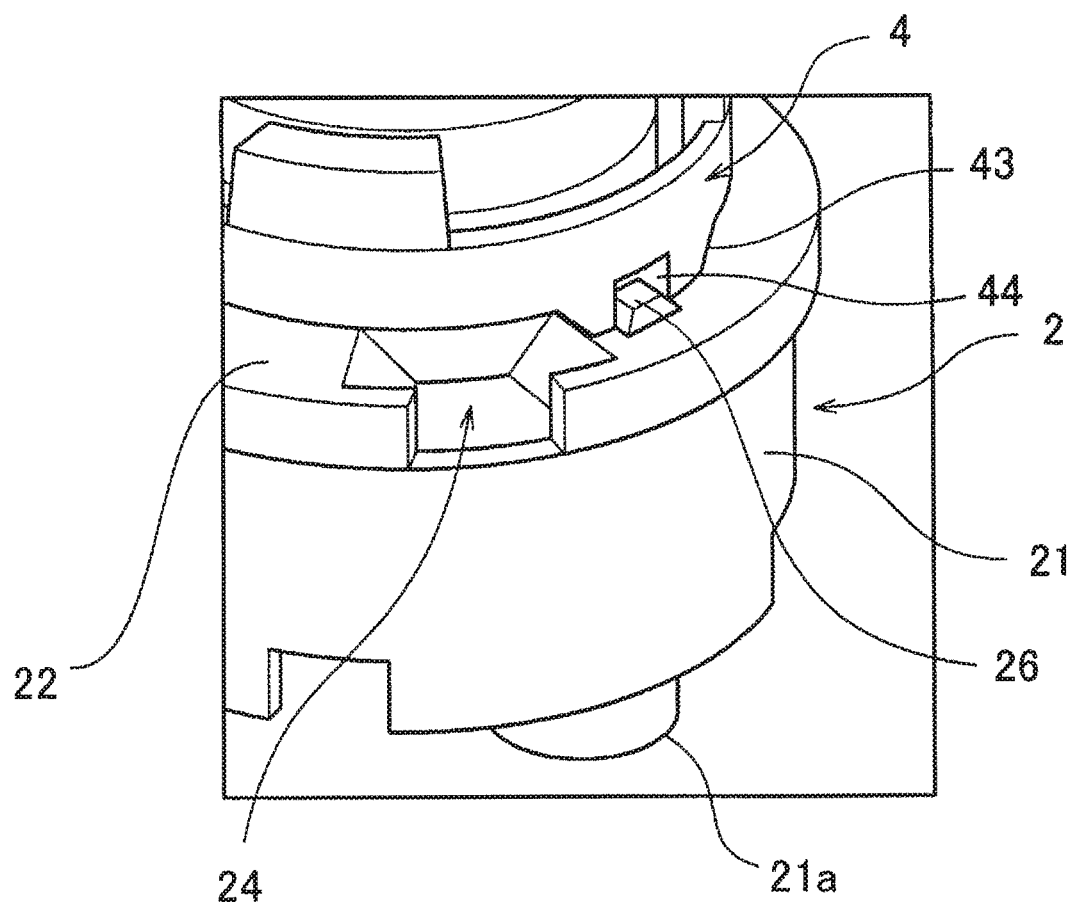
FIG. 7 is a perspective view showing essential parts of a second embodiment of the present invention in an enlarged manner.

FIG. 7 shows a second embodiment of the present invention.

In the embodiment, a recessed portion 44 is provided at a central part of a lower edge of the protrusion edge part 43 in the first embodiment.

On the other hand, on the erection base portion surface 22 of the shaft 2, an engagingly locking protrusion 26 with which the recessed portion 44 of the protrusion edge part 43 drops and engages is provided at the folded storage position P1 of the door mirror unit 3.

According to the structure of the second embodiment, the recessed portion 44 of the protrusion portion 43 and the engagingly locking protrusion 26 of the erection base portion surface 22 corresponding thereto are small in dimensions in the structural point of view, engaging locking forces thereof are respectively applied to engagingly locking forces of the protrusion portions 25, 39 described previously; and therefore, it is possible to enhance the rotation regulation effect of the door mirror unit 3 in the deployment direction at the folded storage position P1 described previously.

It is to be noted that, although in the embodiment, the door mirror of the manual storage type was shown as an example, it is also possible to apply to a door mirror of an electrically driven storage type.

The invention claimed is:

1. A vehicular door mirror comprising:
a door mirror base which is fixed to a vehicular side part;
a shaft which is fixed to the door mirror base; and
a door mirror unit which is rotatable about the shaft at a folded storage position and a deployed use position via a bearing portion,
wherein the bearing portion is a structure which is equipped with a substantially annular rotation regulating groove at a lower face side thereof, and which, in the rotation regulating groove, is arranged so as to engage with a rotation regulating piece, provided in the shaft, to specify the folded storage position of the door mirror unit, and a rotation moderation mechanism provided respectively at the shaft and the bearing portion, to retain a deployed use position of the door mirror unit, and
wherein an upper edge of the rotation regulating piece and a groove top face of the rotation regulating groove opposing the upper edge of the rotation regulating piece have respective protrusion portions, where an upper one of the protrusion portions is arranged to ride over a lower one of the protrusion portions, to drop, and to engage adjacent the lower protrusion portion in a course of rotation of the door mirror unit from the deployed use position to the folded storage position specified by the structure in accordance with the rotation regulating piece and then to retain the folded storage position.

2. The vehicular door mirror according to claim 1,
wherein the rotation moderation mechanism comprises:
a rotation top formed in a shape of a ring, which is movably disposed to be engagingly inserted into the shaft and of which rotation is constrained with respect to the bearing portion; and
a spring to press the rotation top against an erection base portion surface of the shaft; and
wherein a protrusion edge part which is provided on a bottom face of the rotation top and a recessed portion which is provided on the erection base portion surface of the shaft are respectively capable of dropping and engaging with each other at the deployed use position of the door mirror unit.

3. A vehicular door mirror comprising:
a door mirror base which is fixed to a vehicular side part;
a shaft which is fixed to the door mirror base; and
a door mirror unit which is rotatable about the shaft at a folded storage position and a deployed use position via a bearing portion,
wherein the bearing portion is a structure which is equipped with a substantially annular rotation regulating groove at a lower face side thereof, and which, in the rotation regulating groove, is arranged to engage and dispose a rotation regulating piece, provided in the shaft, and a rotation moderation mechanism, provided respectively at the shaft and the bearing portion, to retain a deployed use position of the door mirror unit, and
wherein an upper edge of the rotation regulating piece and a groove top face of the rotation regulating groove opposing the upper edge of the rotation regulating piece are provided with respective protrusion portions, which ride over, drop, and engage in a course of rotation from the deployed use position to the folded storage position of the door mirror unit and then retain the folded storage position,
wherein the rotation moderation mechanism comprises a rotation top, which is movably disposed to be engagingly inserted into the shaft and of which rotation is constrained with respect to the bearing portion, wherein a protrusion edge part, which is provided on a bottom face of the rotation top, and a first recessed portion, which is provided on the erection base portion surface of the shaft, are respectively capable of dropping and engaging with each other at the deployed use position of the door mirror unit, and
wherein a second recessed portion is provided at a lower edge of the protrusion edge part of the rotation top, and on the erection base portion surface of the shaft, there is provided an engagingly locking protrusion with which the second recessed portion of the protrusion edge part is configured to drop and engage at the folded storage position of the door mirror unit.

4. The vehicular door mirror according to claim 3,
wherein the rotation top is formed in a shape of a ring, and the rotation moderation mechanism further comprises:
a spring to press the rotation top against the erection base portion surface of the shaft.

* * * * *